(12) United States Patent
Dooley

(10) Patent No.: US 7,443,642 B2
(45) Date of Patent: Oct. 28, 2008

(54) ELECTRIC MOTOR CONTROL

(75) Inventor: Kevin A. Dooley, Mississauga (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 96 days.

(21) Appl. No.: 11/420,602

(22) Filed: May 26, 2006

(65) Prior Publication Data

US 2008/0019062 A1    Jan. 24, 2008

(51) Int. Cl.
*H02H 7/08* (2006.01)
*H02K 1/22* (2006.01)

(52) U.S. Cl. ................ 361/23; 310/49 R; 310/201; 310/266

(58) Field of Classification Search ......... 318/496, 318/767; 310/113, 114, 184, 49 R, 201, 310/268; 361/23
See application file for complete search history.

(56) References Cited

U.S. PATENT DOCUMENTS

| | | | |
|---|---|---|---|
| 2,564,320 A | | 8/1951 | Brainard |
| 3,633,083 A | * | 1/1972 | Teodorescu ............ 318/767 |
| 5,254,894 A | * | 10/1993 | Satake et al. ............ 310/114 |
| 5,670,856 A | | 9/1997 | Le et al. |
| 5,917,248 A | * | 6/1999 | Seguchi et al. ............ 290/31 |
| 5,925,999 A | * | 7/1999 | Lakerdas et al. ............ 318/496 |
| 5,936,325 A | * | 8/1999 | Permuy ............ 310/162 |
| 5,953,491 A | | 9/1999 | Sears et al. |
| 6,153,993 A | | 11/2000 | Oomura et al. |
| 6,695,183 B2 | | 2/2004 | Hancock et al. |
| 6,717,318 B1 | | 4/2004 | Mathiassen |
| 6,920,023 B2 | * | 7/2005 | Dooley ............ 361/23 |
| 6,965,212 B1 | | 11/2005 | Wang et al. |
| 7,262,539 B2 | * | 8/2007 | Dooley ............ 310/184 |
| 2006/0113967 A1 | | 6/2006 | Dooley |
| 2006/0226721 A1 | * | 10/2006 | Dooley et al. ............ 310/113 |

FOREIGN PATENT DOCUMENTS

WO  WO 94/14226  6/1994
WO  WO 95/17035  6/1995

OTHER PUBLICATIONS

PCT International Search Report, Form PCT/ISA/210 pp. 1-3.

* cited by examiner

*Primary Examiner*—Paul Ip
(74) *Attorney, Agent, or Firm*—Ogilvy Renault LLP

(57) ABSTRACT

A method and apparatus is disclosed for controlling a system comprising at least one electric motor. The system includes aspects which permit, among other things, electromagnetically disconnecting a failed permanent magnet motor from said system, weight savings in motor control electronics, controllability benefits and other benefits.

14 Claims, 6 Drawing Sheets

Figure 5

ELECTRIC MOTOR CONTROL

TECHNICAL FIELD

The invention relates generally to electric motors and, more particularly, to the control of electric motors.

BACKGROUND

Motors, such as permanent magnet motors, may be controlled in a variety of ways, but the control electronics can often be heavy and lack compactness. Also, the control of multiple electric motors connected to drive one load typically requires a mechanical disconnect system to disconnect a failed motor from the load, since the failed motor may begin to operate as a generator, potentially creating drag torque and internal heating of the motor. Accordingly, there is a need to provide improvements which address these and other limitations of prior art motor control systems.

SUMMARY OF THE INVENTION

In one aspect, the present invention provides an electric motor system comprising a motor having a magnetic rotor and a magnetically conductive stator, the stator having at least two windings connected with one another in series, the rotor and stator together defining at least a first magnetic circuit encircling a first portion of a first one of the stator windings, the stator defining at least a second magnetic circuit therein, a second one of the stator windings wrapped around a portion of the stator remote from the first magnetic circuit, the second stator winding and said portion of the stator thereby providing an inductor assembly, the second magnetic circuit passing through said stator portion and encircling a second portion of the first stator winding and a portion of the second stator winding, the second magnetic circuit remote from the first magnetic circuit and remote from the rotor, the motor system having a buck regulation apparatus connected in series between a direct current (DC) electricity source and the second winding, wherein the inductor assembly provides a filter inductor function for the buck regulator.

In another aspect, the present invention provides a method for controlling an electric motor system, the system including at least one motor having a magnetic rotor and a magnetically conductive stator having at least one winding, the rotor and stator together defining at least a first magnetic circuit encircling a first portion of a first one of the stator windings, the stator defining at least a second magnetic circuit therein, the second magnetic circuit encircling a second portion of the first stator winding, the second magnetic circuit remote from the first magnetic circuit and remote from the rotor, the method comprising the steps of operating the motor to drive an output shaft thereof, the step of operating including the step of saturating at least a portion of the second magnetic circuit to maintain an impedance of said winding at a first, value during operation, detecting a fault in the motor requiring motor shutdown, and then shutting down the motor, including the step of de-saturating at least said portion of the second magnetic circuit to increase the impedance of the winding to a second value, the second value significantly higher than the first value such that current flow in the winding is effectively limited to a desired value.

Further details of these and other aspects will he apparent from the detailed description and Figures included below.

BRIEF DESCRIPTION OF THE DRAWINGS

Reference is now made to the accompanying Figures in which.

DETAILED DESCRIPTION

Figure 1:
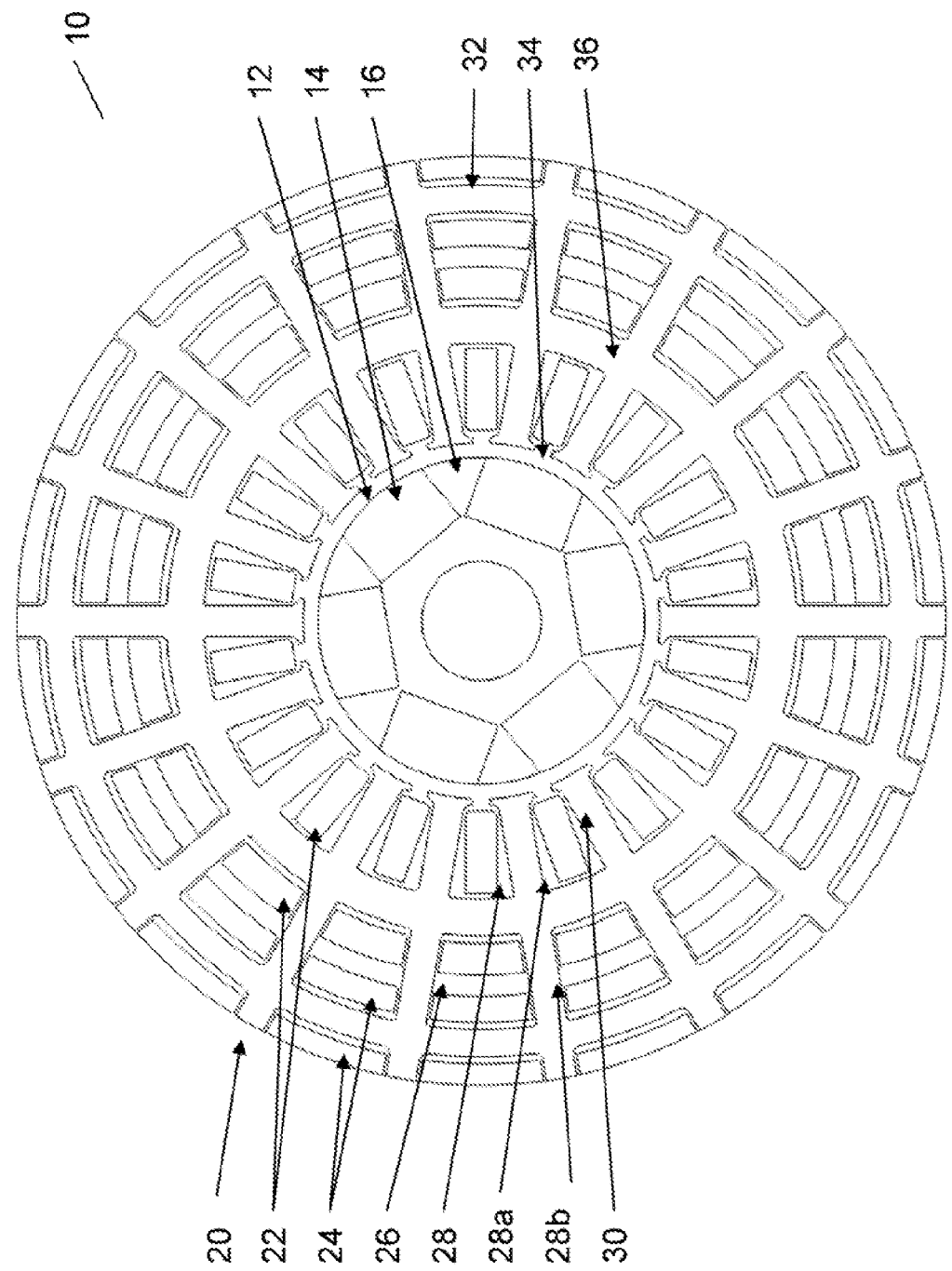
FIG. 1 is a cross-section of a permanent magnet motor.
Figure 2:
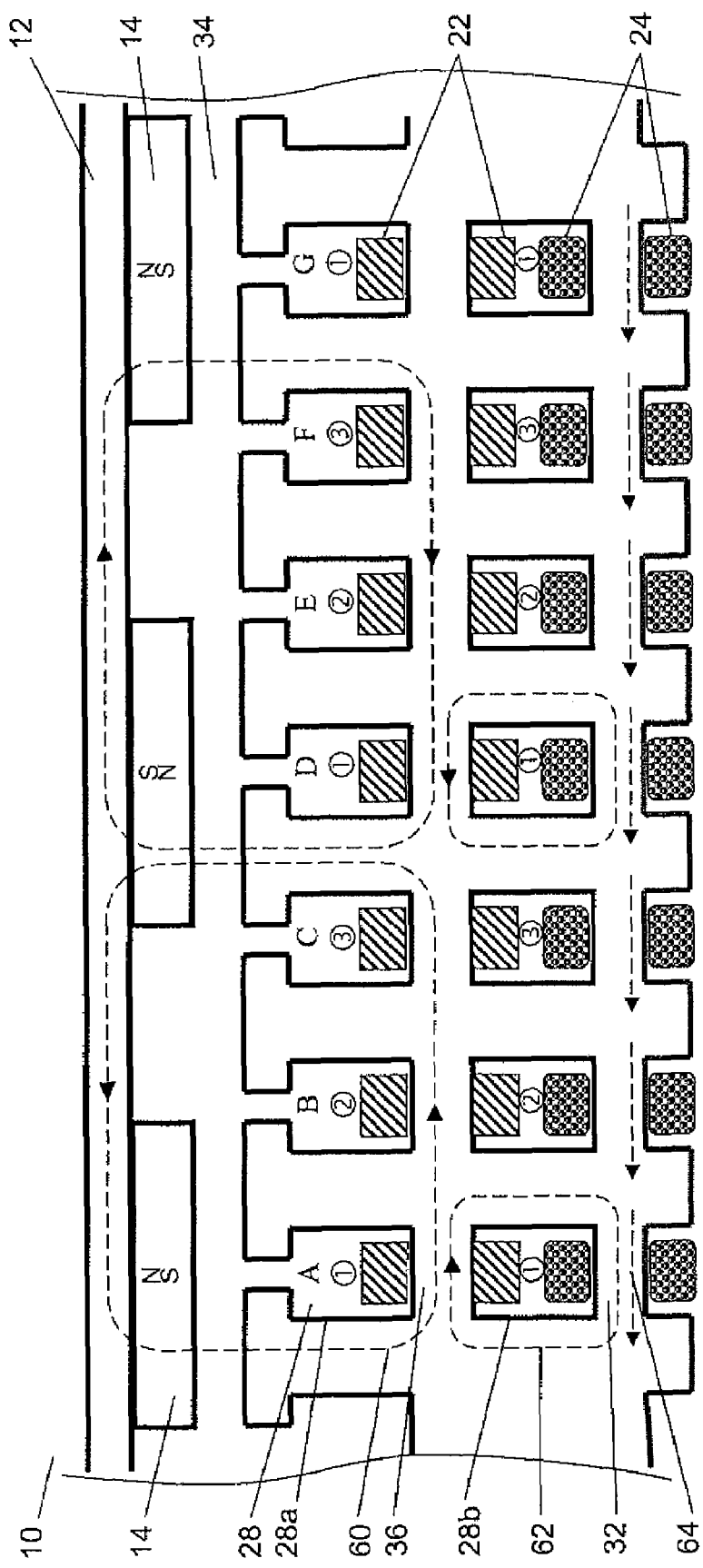
FIG. 2 is a partial schematic of the motor of FIG. 1.

Referring first to FIGS. 1 and 2, a permanent magnet (PM) electric machine 10 is depicted. For ease of illustration and description, FIG. 2 shows a linear arrangement of the electric machine 10 of FIG. 1. However, it is to be understood that the machine 10 is generally preferred to have the circular architecture of FIG. 1, with an inside or outside rotor (FIG. 1 shows an inside rotor, which is preferred but not required). It will also be understood by the skilled reader that the Figures, as well as the accompanying description, are schematic in nature, and that routine details of machine design, have been omitted for clarity, as will be apparent to the skilled reader. The machine 10 may be configured as an alternator to generate electrical power, a motor to convert electrical power into mechanical torque, or both. The motor aspects of such a machine are primarily of interest in the following description, and hence machine 10 will now be referred to as motor 10.

The motor 10 has a rotor 12 with permanent magnets 14, interposed by spacers 16, which rotor 12 is mounted for rotation relative to a stator 20. A retention sleeve (not shown) is typically provided to hold the permanent magnets 14 and the spacers 16. Stator 20 has at least one phase winding 22 and preferably at least one control, winding 24 (both windings are represented schematically in the Figures as a solid rectangles in cross-section, but the skilled reader will appreciate each may comprise multiple turns of a conductor, as described below). In the illustrated embodiment, the stator 20 has a 3-phase design with three essentially electromagnetically-independent phase windings 22 (the phases are denoted by the circled numerals 1, 2, 3, respectively in FIG. 2) and, correspondingly, three control windings 24. The phase windings 22 and control windings 24 are separated in this embodiment by a winding air gap 26 and are disposed in radial slots 28, divided into slot portions 28a and 28b, provided in the stator 20 between adjacent teeth 30. For ease of description, the adjacent slots 23a, 28b are indicated in FIG. 2 as A, B, C, D, etc. The phase windings 22 are electrically insulated from the control windings 24. A back iron 32, also referred to as the control flux bus 32 in this application, extends between and at the bottom of the slots 28b. A rotor air gap 34 separates rotor 12 and stator 20 in a typical fashion. A core or "bridge" portion, also referred to as the "power flux bus" 36 portion of stator 20 extends between adjacent pairs of teeth 30 in slot 28 to form the two distinct slots 23a and 28b. The first slots 28a hold the phase windings 22 only, and the second slots 28b hold both the phase windings 22 and control windings 24.

Figure 3:
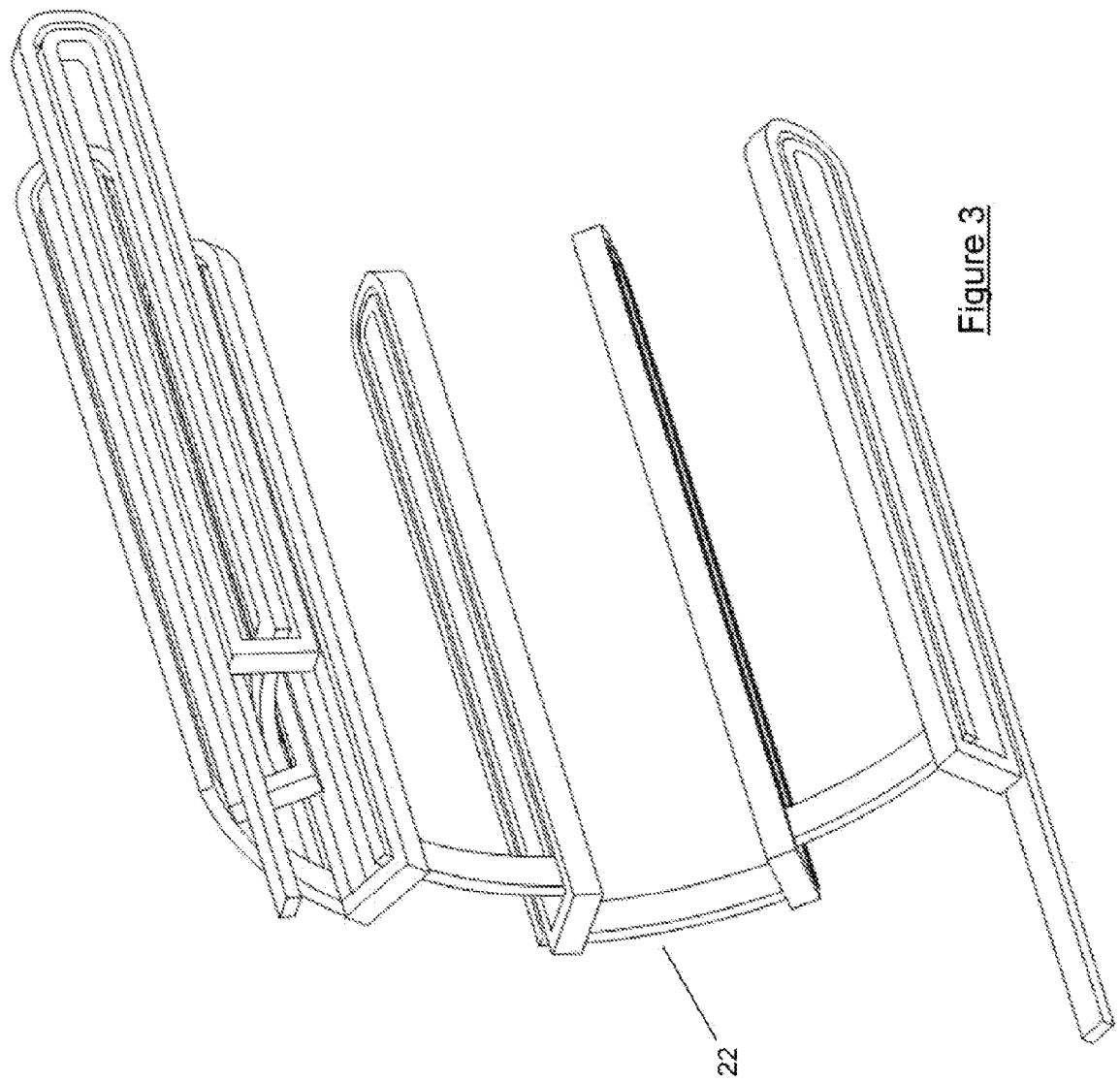
FIG. 3 is a isometric view of a portion of a phase winding of the motor of FIG. 1.

The materials for the PM motor 10 may be any one deemed suitable by the designer. Materials preferred by the inventor are samarium cobalt permanent magnets, copper phase and control windings, a suitable electromagnetic material(s) for the stator teeth and power and control flux buses, such, as electrical silicon steels commonly used in the construction of electromagnetic machines. The stator teeth, power and control flux buses may be integral or non-integral with one another, as desired. Each of the phase windings 22 in this embodiment consists of a conductor with turns per slot, which enters, for instance, the first slot portion 28a of a selected slot 28 (e.g. at slot "A"), extends through the slot and exits the opposite end of the slot, and then radially crosses the power flux bus 36 to enter the second slot portion 28b of the same slot 28 (e.g. at slot "A"), after which it extends back through the length of the selected slot, to exit the second slot portion 28b, and hence exits the slot 28 on the same axial side of the stator as it entered. This path is repeated times to provide the 4 turns of the phase winding in that slot set 28a, 28b, before proceeding to the next relevant slot set in the stator. The conductor of phase winding 22 then proceeds to the second slot 28b of the next selected slot 28 (e.g. slot "D" in FIG. 2), where the phase winding 22 then enters and passes along the slot 28, exits and radially crosses the power flux bus 36, and then enters the adjacent first slot portion 28a of the selected slot 28, and then travels through the slot again to exit slot 28a and the stator adjacent where the winding entered the slot 28b of the selected slot 28. This path is also repeated times to provide the turns of the phase winding in this slot set 28a, 28b, before proceeding to the next relevant slot set in the stator. The phase winding then proceeds to the next selected slot 28 (e.g. slot "G"), and so the pattern repeats for second phase winding 22 corresponding to phase 2 (not shown), begins in an appropriate selected slot (e.g. slot B of FIG. 2) and follow an analogous path, but is preferably wound in an opposite winding direction relative to winding 22 of phase 1. That is, the phase 2 winding 22 would enter the selected slot (slot B) via slot portion 28b (since phase 1 winding 22 entered slot A via slot portion 28a, above), and then follows a similar hut opposite path to the conductor of phase 1, from slot to slot (e.g. slots B, E, etc.). Similarly, the phase 3 winding 22 is preferably oppositely-wound relative to phase 2, and thus enters the selected slot (e.g. slot "C") of the stator via slot portion 23a, and follows the same general pattern as phase 1, but opposite to the pattern of phase 2, from slot to slot (e.g. slots C, F, etc.). Thus, as mentioned, the phases of the phase winding 22 are oppositely-wound relative to one another, for reasons described further below. FIG. 3 shows an isometric free-space view of a portion of a phase winding 22 wound, as just, described, but for the fact that only two turns are shown for reasons of drawing clarity.

Meanwhile, a control winding (s) 24 is wrapped around the control flux bus 32, in a manner as will now be described. In this embodiment, control winding 24 preferably forms loops wrapped preferably in a positive turns ratio relative to the phase winding. In this case, a control-to-phase turns ratio of 3:2 is preferred, such that the control winding is wrapped 6 times around the control flux bus 32 (relative to the phase winding's 4 turns), for reasons described below. The control winding 24 and control flux bus 32 thus provide an integral saturable inductor in stator 20, as will be discussed below. The direction of winding between adjacent second slots 28b is preferably the same from slot to slot, and thus alternatingly opposite relative to the phase winding 22 of a same phase wound as described above, so that a substantially net-zero voltage is induced in each control winding 24, as will also be described further below. Preferably, all loops around the control flux bus 32 are in the same direction. Note that the control winding 24 does not necessarily need to be segregated into phases along with the phase windings, but rather may simply proceed adjacently from slot to slot (e.g. slots A, B, C, D, etc.). Although it is preferred to alternate winding direction of the phase windings, and not alternate direction of the control windings, the phase and control windings are preferably wound in relative opposite directions and in equal slot numbers to ensure a substantially net-zero voltage is induced in each control winding 24 as a result of current flow in the phase windings 22, so that the function described below is achieved. If the control winding is segregated into phase correspondence with phase windings 22, for example to reduce its inductance by a series parallel arrangement, preferably there are equal numbers of slots of a given phase in which the phase winding and control winding are wound in opposite directions, to yield the desired induced net-zero voltage.

In use, in a motor mode, a 3-phase power source drives phase windings 22, which result in current flow in phase windings 22 and a primary magnetic flux along magnetic flux path or magnetic circuit 60. Interaction of permanent magnets 14 and primary magnetic flux causes rotor 12 to move relative to stator 20. When the current flow in phase windings 22 is appropriately controlled, the motor 10 rotates with a speed and torque. A current or voltage controller appropriately controls the current flow to the phase windings 22 such that an appropriate speed and torque is obtained. The current in the control windings in normal operation of the motor is substantially the same as the current flow in the phase windings, because they are connected in series, except that in this embodiment current is preferably DC in the control windings, and AC in the phase windings. The implications for motor control will be discussed further below.

Primary magnetic circuit 60 includes rotor 12, magnets 14, rotor air gap 34, power flux bus 36 and the portion of stator teeth 30 between rotor 12 and power flux bus 36. Primary magnetic circuit 60 encircles a portion of phase winding 22 and is generated in motor 10 by the combined effect, of the rotor magnets and an electrical current in phase windings 22. Secondary magnetic circuit 62 includes power flux bus 36, control bus 32 and the portion of stator teeth 30 between control bus 32 and power flux bus 36. In this embodiment, secondary magnetic circuit encircles the portions of the phase winding 22 and control winding 24 in slot 28b. Power flux bus 36 divides slot 28 into two slot portions or openings 28a and 28b, with one opening 28a for the phase winding only, and another opening 28b for the phase and control windings. The primary magnetic circuit encircles an opening 28a while the secondary magnetic circuit encircles an opening 28b. Opening 28a is preferably radially closer to the rotor than opening 28b. Power flux bus 36 is common to both the primary and secondary AC magnetic circuit paths in this embodiment. AC current in the phase windings 22 causes a secondary magnetic flux to circulate secondary magnetic circuit 62 when the control bus 64 is not in a saturated state. The primary and secondary magnetic circuits are non-overlapping (i.e. non-intersecting), and remote or isolated from one another. The second magnetic circuit is remote from, and does not include, the rotor and is preferably defined wholly within the stator assembly.

A tertiary magnetic circuit 64 preferably circulates around control bus 32, as partially indicated in FIG. 2 (i.e. only a portion of the tertiary circuit is shown, as in this embodiment the tertiary circuit circulates around the entire stator 20). The control flux bus 32 is preferably common to both the secondary and tertiary magnetic circuit paths and thus the secondary and tertiary magnetic circuits are snare a common portion, namely the control bus 32, as will, be discussed further below. At least a portion of control flux, bus 32 is saturable by the flux density of the tertiary magnetic circuit.

Magnetic flux preferably circulates the tertiary magnetic circuit 64 in the same direction around the control flux bus 32. As mentioned above, although the control winding 24 is provided in the second slots 28b corresponding to a particular phase of the three-phase machine described, the phase windings 22 are wound in the opposite direction in each first slot 28a which is due to the opposite polar arrangement of the magnets 14 associated with each adjacent first slot 28a of the phase. To ensure that a uniform direction for the tertiary magnetic circuit 64 is provided, as mentioned, the control windings 24 are preferably wound in the same direction in ail second slots 28b.

When the control flux bus is magnetically saturated, the inductance (thus impedance) of the phase windings is very low, as if there where no secondary AC magnetic circuit. However, if zero current is applied to the control winding (i.e. the control winding is open circuited, or otherwise switched off), the impedance of the phase windings increases significantly, thus limiting the current that can flow in the phase windings, which may be used to remediate, for example, a faulted condition, such as an internally shorted phase winding or short circuits in the drive electronics. This impedance control has beneficial implications for PM motor control, discussed further below.

It is to be understood that the above description applies only to phase "1" of the described embodiment, and that similar interactions, etc. occur in respect of the other phases. Further details and aspects of the design and operation of motor 10 are found in applicant's co-pending application Ser. No. 10/996,411, filed Nov. 26, 2004, the contents of which is incorporated herein by reference.

Thus, in use, in a motoring mode, a power source drives phase windings 22, and control windings 24. Since in one particular arrangement depicted in FIG. 5 the two are effectively connected in series, the control winding current is equivalent, (i.e. in magnitude) to the phase winding current. As a result of the 3:2 turns ratio between these two windings, the slightly higher number of turns in the control winding helps ensure that the control bus is always in a fairly saturated condition during normal motor operation, so as to enable efficient functioning of the motor at any drive current. As discussed above, although the AC flux in the phase windings tends to cancel out the DC flux in the control winding in the control bus sections where the flux directions are in opposition, the 3:2 turns ratio bias in the control coil, prevents the fluxes from actually cancelling. Thus, when the control flux bus 32 is magnetically saturated by the action of current flowing through the control winding 24, the inductance (thus impedance) of the phase windings 22 is very low, as if there where no secondary AC magnetic circuit, and hence the control windings and secondary magnetic circuit would be essentially "invisible" to the motor during normal motor operation.

In the arrangement depicted in FIG. 5 the number of turns on the control winding slots will typically be chosen to be more than the number of turns in the phase winding slots, such to ensure saturation of the control bus (however preferably not much into saturation, since some inductance in the control winding is a useful, inductor for the buck regulator filter function as described below) by having a preferably just marginally more ampere turns on the control winding than on the phase windings in the secondary magnetic circuit. The DC flux in the control bus typically dominates relative to the opposing AC flux density in the secondary magnetic circuit, holding the control bus in saturation down to quite low relative values of drive current provided, via the control winding to the phase windings, even under the effects of the counter fluxes from the phase windings (i.e. the portion of the phase winding carrying AC in the negative portion of the cycle tends to reduce saturation of the control flux bus, unless the control ampere turns are high enough to maintain saturation).

In use in a fault or shut-down mode, when the drive current to the motor is at or close to zero, i.e. such as when, the motor is shut down in response to a fault condition, the control bus de-saturates (as a result of no control current being supplied) and, as a result, the interaction between the primary and secondary magnetic circuits and the inductor-like effect of the control winding 24, impedes any significant generated currents from flowing in the phase windings due to continued rotation of the shut-down motor and any short circuit failure in the main phase circuits. Further discussion is found in applicant's co-pending application Ser. No. 10/996,311.

Figure 4:
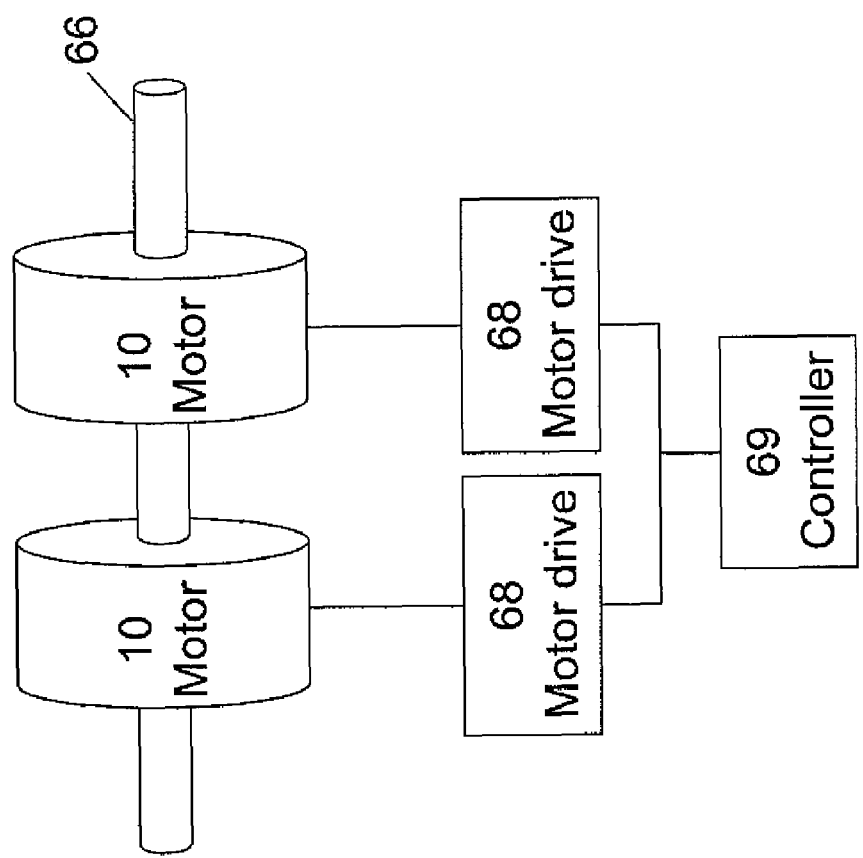
FIG. 4 is a schematic of an arrangement of two motors according to FIG. 1.

FIG. 4 shows a redundancy arrangement in which two motors 10 are co-mounted on the same output shaft 66, and driven by suitable motor drives 68, each in communication with a system controller 69, and operated as described above. If one motor 10 should fail in a short circuit, open circuit or ground (whether in the motor itself or the drive electronics or lead wires), the drive(s) 68 preferably adjusts control of the remaining motor 10 (or motors 10, if there are more than two provided in total, and two or more are to remain operational in the event of the shutdown of one) to compensate for the resulting loss in torque, and the failed motor is no longer driven. The controller 69 provides the appropriate control to motor drives 68. As described above, the failed motor is also in effect disconnected, by bringing current flow in its windings to zero, resulting in the impedance of the main phase windings of the failed motor increasing to a high value, as previously described, such that the drag torque due to a short circuit type failure is minimised. Motor failure detection 84 may be achieved using any suitable approach, such as incorrect speed or torque as a function of current, voltage, high temperature, machine impedance, etc. Failure detection preferably results in a signal provided to an appropriate controller for interrupting the current supply to the motor system (i.e. bringing current flow to zero, as mentioned above).

Figure 5:
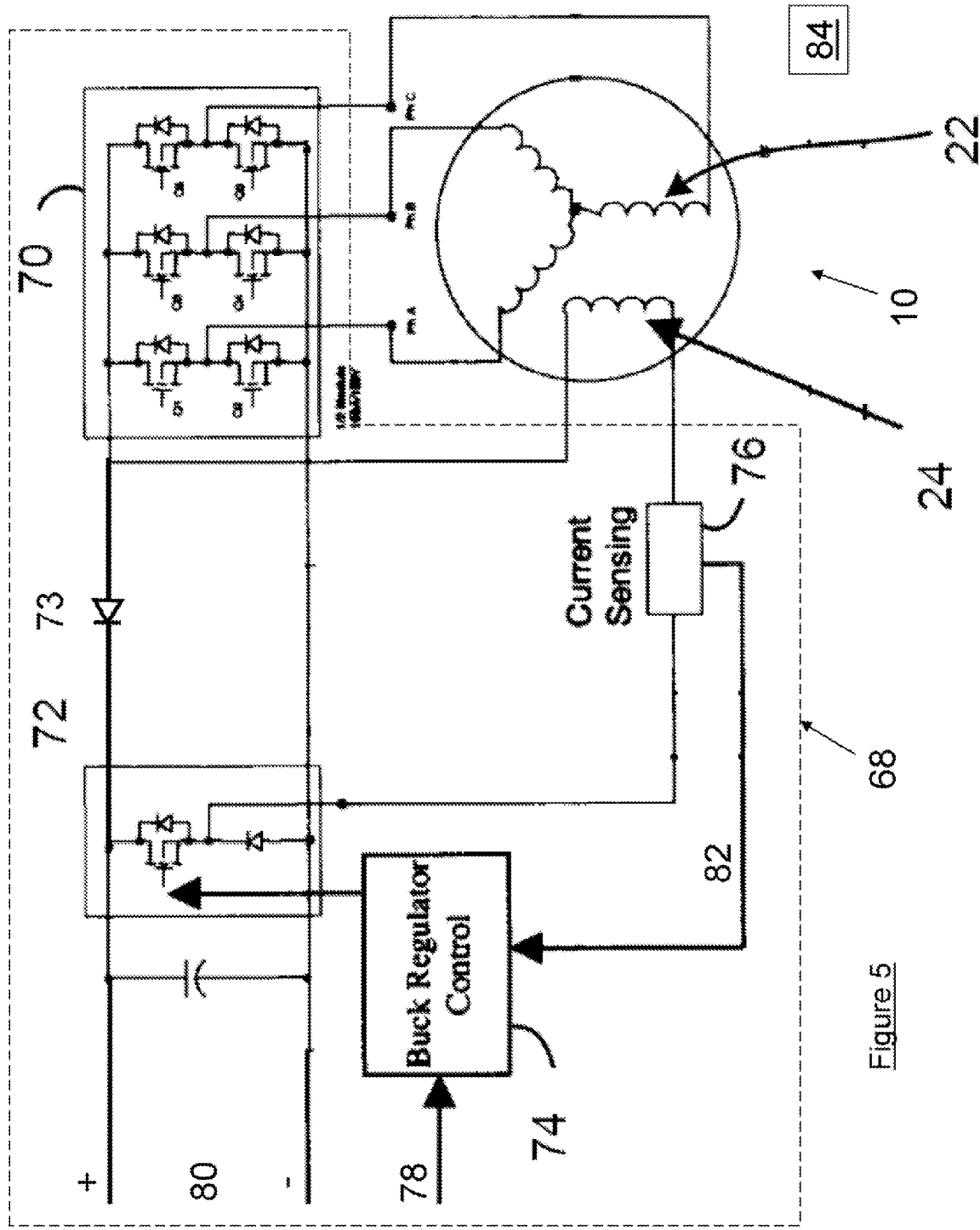
FIG. 5 is a schematic diagram of a control, scheme arrangement for the motors of FIG. 1 and/or 4.

FIG. 5 shows a simplified example control scheme for a motor drive 68 for driving a motor 10. It should be noted that the motor 10 schematically depicted in FIG. 5 depicts only a single control winding for the 3 phases of its associated phase winding set, the control winding proceeding slot-to-slot in the stator irrespective of the phase arrangements of the phase windings. As discussed generally above, this is just one of many control winding arrangements possible, and the skilled reader will be able to apply the present teachings to such arrangements in light of the teachings herein.

The motor 10 is driven by a motor drive 68, preferably comprising a 3-phase H-bridge commutation circuit 70 driving the phase windings 22 of the motor 10. The commutation scheme is preferably a six step 120-degree overlapping scheme in a "drake before break" sequence. This sequence in conjunction with a feedback diode 73 reduces high amplitude voltage spikes occurring at the input of the inverter section of the H-bridge commutation circuit 70 due to the inductive effect of the control winding 24 of motor 10. Current flow to the motor, and thus the motor's torque and speed, is adjusted using a suitable pulse width modulated supply system or "buck regulator" circuit 72 connected to control winding 24 of the motor 10. The buck regulator may be any suitable circuit. The skilled reader will appreciate that buck regulators typically require a filter inductor as an energy storage device for stepping down the voltage level. In this configuration, the buck regulator 72 uses the control winding(s) 24 as its inductor, thus eliminating the need for an additional inductor, and consequently reducing the weight of the buck regulator 72.

This filter inductor replacement role of the control winding may dictate design features of the control winding, as the designer will consider the buck regulator requirements as well as the motor requirements in providing a suitable control winding configuration. The output of the control winding 24 is connected to the inverter section of the H-bridge commutation circuits 70, such that a DC-current in the control winding 24 becomes AC current to the phase windings 22 of the motor 10.

A feedback 82 of the drive current level is provided to a buck regulator controller 74 using a current sensor 76. The buck regulator and controller are of any suitable type, which includes suitable types well-known to the skilled reader, and thus need not be discussed further here.

In use, the buck regulator 72 varies the current flow to the phase windings 22 of the motor 10, and thus controls the torque and speed of the motor 10, based on an input torque/speed request 78 received from system controller 69. Current is provided from a DC source 80 to the phase windings 22, via the control winding 24, as already described.

Referring again to FIG. 4, preferably both motors 10 and their associated controllers 68 are arranged as described with reference to FIG. 5, to provide a dual-redundant motor system. To enhance redundancy protection, preferably separate DC sources 80 are provided for each motor system. The operation of such a dual redundant system according to FIGS. 1-5 will now be described.

Referring again to FIGS. 4 and 5, in a normal operation mode of the motors 10, the drive 68 to each motor 10 is adjusted so that the motors contribute in desired proportions to the torque delivered to shaft 66, and the shaft rotates at a desired speed, as requested by system controller 69. Both motors 10 are preferably driven concurrently to provide torque and, when a higher efficiency operation or higher power operation is desired, the respective drives 68 can be adjusted accordingly to adjust the contribution proportion of each motor 10. The control winding 24 of each motor 10 functions as the filter inductor for its respective buck regulation circuit, as described above. Also as described above, the control winding 24 of each motor preferably also keeps its respective control bus saturated (by virtue of the relative turns ratio between phase and control winding) to keep the control winding otherwise virtually "invisible" to the motor 10. Should one motor 10 fail, such as in a short circuit, open circuit or ground, the drive 68 to the other motor 10 can be adjusted using its buck regulator 72 to increase the AC input to the phase windings 22 of the operational motor 10 to compensate for the loss in torque caused by loss of the other motor 10. As the skilled reader will appreciate, the failed PM motor 10 can tend to add drag and heat to the system, however with the present arrangement the failed motor 10, can be "turned off" by no longer energising the windings (i.e. and thus the current in the control winding is reduced to zero), which thus adjusts the failed motor 10 to a high impedance condition for the phase windings, as already described, thereby minimising drag and heat generation. The currents to the respective control windings and inverters is controlled by external control signals provided to the buck regulator circuits. If the system controller 69 requests zero current, then the relevant buck regulator stops providing current accordingly. This control command is preferably based on the system, controller 69 detecting a fault or other command to set the current to sera. The resulting adjustment of the impedance characteristics of the phase windings of the affected motor 10, from low impedance during proper motor function to a high impedance in the failed condition, results in much improved operation and controllability, particularly in PM motors where rotor excitation cannot be independently controlled.

Figure 6:
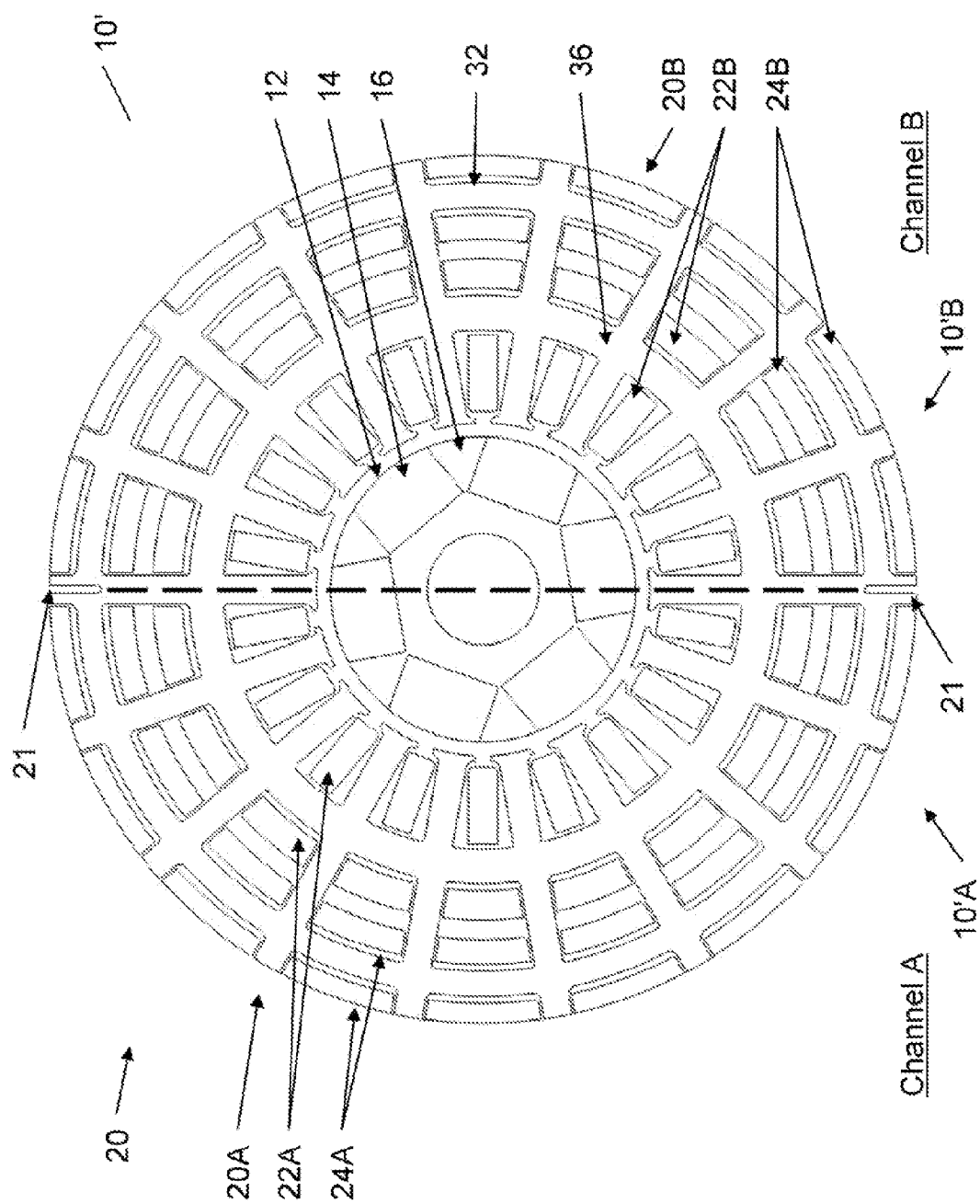
FIG. 6 is a cross-sectional view, similar to FIG. 1, of a another arrangement for a motor.

FIG. 6 illustrates a 3-phase, "dual channel" m motor 10* according to the general "multi-channel" principles described in applicant's U.S. Pat. No. 6,965,133, but modified in accordance with the above teachings, as will now be discussed further. The same reference numerals are used to denote the analogous elements described with reference to the embodiments above, and thus all elements will not be redundantly described here. Stator 20 of dual channel FM machine 10' is conceptually divided into an "A" half and a "B" half, thus providing a distinct stator sector for each channel, each channel provided with its own independent windings sets. Thus windings 22 and 24 will be described in terms of phase winding sets 22A and 22B and control winding sets 24A and 24B, as discussed further below. Other features associated with channels a and B are also described as "A" or "B", specifically, to indicate their respective channels, Motor 10' has a multi-channel architecture (in this case, dual channel), in that a plurality of circumferentially distributed distinct and fully independent (i.e. electromagnetically separate) "sets" of phase and control windings are provided in each stator sector corresponding to the multiple channels. In this case, two such sets of 3-phase phase and control windings are provided, namely a 3-phase set of phase windings 22A and 22B and respective control windings 24A and 24B (which happen to be single phase in this embodiment). This multi-channel architecture provides a plurality of functional "motor elements" within the same machine structure, which may either be operated in conjunction, or independently, as desired. The construction of motor 10' is otherwise generally as described above with respect to the single channel embodiment of motor 10.

The dual channel FM motor 10' provides a single rotor rotating relative to two effectively independent stators, or stator sections. Thus, rotor 12 rotates relative to a stator sector 20A (i.e. the portion of stator 20 with phase windings 22A) and also relative to a stator sector 20B (i.e. the portion of stator 20 with phase windings 22B). When operated as a motor, the two "motors" (i.e., in effect, motors 10'A and 10'B) are driven independently, as described generally above with respect to motor 10, but are synchronized such that they co-operate, as if only one "motor" is present. In normal motoring mode, the two "motors" (10'A and 10'B) of motor 10' are operated as described above with respect to motors 10 in FIG. 4. Likewise, if one channel of the machine 10' should fail in a short circuit, open circuit or ground (whether in the motor 10' itself, or in the drive electronics or lead wires), the drive to the remaining channel, is adjusted to compensate for the loss in torque, and the failed channel is no longer driven. The drive of the failed channel is effectively disconnected by bringing current flow in the windings to zero, resulting in the impedance of the main phase windings of the channel increasing to a high value, as previously described, such that the drag torque due to a short circuit type failure in the channel, is minimized. This multi-channel configuration offers two fully redundant systems (i.e. channel A and channel B) with a minimum, of hardware, thereby minimizing weight and space and increasing reliability- Channel failure detection may be achieved using any suitable approach, such as incorrect speed or torque as a function of current, voltage, high temperature, machine impedance, etc.

Referring again to FIG. 6, the stator of the multi-channel motor 10' preferably includes means for impeding cross-talk between the tertiary magnetic circuits of channels A and B, such as is described in applicant's co-pending application Ser. No. 11/419,238 filed May 19, 2006. As described in that application, the presence of a cross-talk reduction feature, such a stator slit 21 acts to substantially contain, the tertiary magnetic within the channel. As such, the tertiary magnetic preferably travels along the entire length of the control flux bus 32 to the channel boundary, where the presence of the cross-talk reduction slit 21 redirects the flux up to power flux bus 36, where it then travels back alexia entire length of the power flux bus 36 (this flux is not present, and therefore not depicted, in the single channel embodiment of FIG. 2), until the path joins up again with the beginning of the tertiary path, in the vicinity of another cross-talk reduction slit 21.

Figure 7:
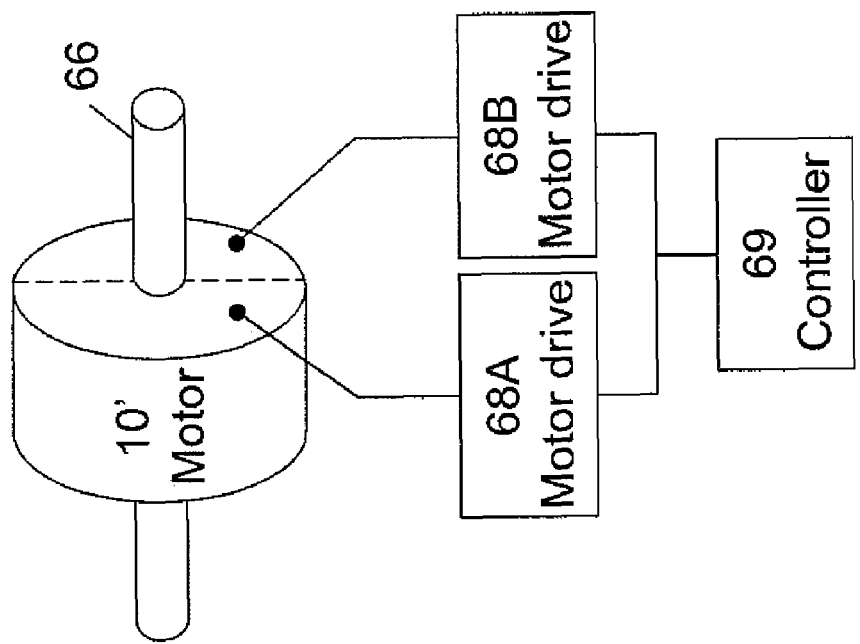
FIG. 7 is a schematic diagram of a control scheme for the motor of FIG. 6.

Referring to FIG. 7, a control system for dual-channel motor 10' is shown. FIG. 7 is similar to FIG. 4, but for the configuration of motor 10' in FIG. 7 relative to two motors 10 of FIG. 4. Motor drives 68A and 68B are preferably each as described above with respect to FIG. 5, and this two independent motor drives are provided, one for each channel of motor 10'. In use, a similar operation is obtained when the control scheme of FIG. 5 is applied to the dual channel motor 10' of FIG. 7. Accordingly, in normal operation, channels A and B may be operated separately, or conjunctively, and motor drives 68A and 68B are controlled accordingly by controller 69. When, a failure is detected on one motor channel, the current flow in its respective control windings 24 is set to zero in order to increase impedance of the phase windings and thereby minimise a drag torque and other undesirable effects otherwise brought on by the failed channel.

The dual-channel design of FIGS. 6 and 7 offers obvious size and weight savings over the two motors system as shown in FIGS. 4 and 5. The two motor design of FIG. 4 and 5, however, has its own advantages over the dual-channel arrangement of FIGS. 6 and 7, such as simplicity of individual components.

The skilled reader will appreciate that a failure is not required to turn a channel or motor "off" as described above, but rather the approach may be used in any suitable situation where it is desired to shut a channel "off", including as part of a normal operation scheme.

In another control scheme, depicted in FIG. 7, the dual motor arrangement of FIG. 4, or as the case may be, the dual, channel motor of FIG. 7, is controlled using a modified motor drive 68' in which buck regulator 72 has a dedicated filter inductor 83 independent from the control windings 24. Separate DC current sources 80 and 81 respectively drive the phase and control windings independently from one another. Phase windings may be driven as described above with respect to FIGS. 5 and 7, so that torque is split as desired among the motors or channels in normal operation, during which time the DC source 81 provides control current at a sufficient level to keep the control flux bus fully saturated at all times, for reasons already described. In the event of a channel failure, phase winding current in the other motor/channel is adjusted to compensate for the loss of torque due to the failed channel, while the current from source 81 to the control winding(s) for the failed channel is brought to zero to minimize the drag torque due to the failed channel, In this embodiment, the control winding has different design constraints than the above embodiments, and thus the control winding may have a higher number of turns relative to the phase windings, to minimise the amount of control current required to saturate and maintain saturation in under the influence of desaturating fluxes from the main phases.

In the arrangement of FIG. 7, where the control current is supplied from a source separate from the phase windings, and is independently variable relative to the phase windings, if the phase winding current in the motor/channel exceeds a specific value, such as a desired maximum limit, the inductance of the phase winding will abruptly increase, tending to limit the current in the phase winding to that specific value or limit. This can be used to simplify the drive system, of very low impedance (i.e. high speed) PM motors. For example, the motor can be designed using this feature to intrinsically limit inrush current on start-up by appropriately designing this feature into the motor, such that other typical inrush limiting techniques, such as duty cycle control, may be omitted or operated at lower frequencies.

The above description is meant to be exemplary only, and one skilled in the art will recognize that changes may be made to the embodiments described without department from the scope of the invention disclosed. For example, the number of phases in the motors could be varied and could be to any number. The motors may be single or multi-phase, single or multi-channel. The windings may have single or multiple turns per slot, the number of turns of a winding not; necessarily has to be a whole number. The number of phase windings does not necessarily have to equal the number of control windings, and one or more windings may perhaps be present in a slot. The windings may be any conductor(s) (i.e. single conductor, more than one wire, insulated, laminated, hits etc) or may be superconductors. In multiphase alternators, there may be delta or Y-connected windings in accordance with suitable techniques. There need not be an air gap between the phase and control windings, as long as the windings are electrically isolated from one another. The rotor can be any electromagnetic configuration suitable (i.e. permanent magnet rotor not necessary), and may be provided in an outside or inside configuration, or any other suitable configuration. Other winding configurations are possible, and those described above need not be used at all, or throughout the apparatus. Also, the magnetic circuits described can be arranged in the stator (and/or rotor) in any suitable manner. The magentic circuits need not be provided in the same stator, but rather the primary and secondary magnetic circuits may be provided in separate stator elements. Any suitable stator configuration may be used, and the stator of FIGS. 1 and 4 are exemplary only. The stator need not be slotted as shown, nor slotted at all. The arrangement of the primary, secondary and tertiary magnetic circuits, and the arrangement of phase winding saturation apparatus(s) in the motors may be any suitable arrangement. Likewise, the stator and rotor may also have any suitable configuration. Although DC is preferred in the control windings 24 of the motor or channel, any suitable saturating arrangement may be used. For example, a suitable saturation apparatus may be provided using permanent magnetic means to selectively saturate a portion of the secondary magnetic circuit, rather than using the electromagnetic means of the control winding. Any suitable motor drive arrangement may be employed. The present technique may also be employed with stand-alone motors if desired, and redundant systems are not required, but merely one apparatus arrangement: which may benefit from the application of the above principles. Still other modifications which fall, within the scope of the present invention will be apparent to those skilled in the art, in light of a review of this disclosure, and such modifications are intended to fail within the appended claims.

I claim:

1. An electric motor system comprising a motor having a magnetic rotor and a magnetically conductive stator, the stator having at least two windings connected with one another in series, the rotor and stator together defining at least a first magnetic circuit encircling a first portion of a first one of the stator windings, the stator defining at least a second magnetic circuit therein, a second one of the stator windings wrapped around a portion of the stator remote from the first magnetic circuit, the second stator winding and said portion of the stator thereby providing an inductor assembly, the second magnetic circuit passing through said stator portion and encircling a second portion of the first stator winding and a portion of the second stator winding, the second magnetic circuit remote from the first magnetic circuit and remote from the rotor, the motor system having a buck regulation apparatus connected in series between a direct current (DC) electricity source and the second winding, wherein the inductor assembly provides a filter inductor function for the buck regulator.

2. The electric motor system as defined in claim 1, further comprising a commutation apparatus connected in series between the second and first windings and adapted to commutate DC electricity provided by the second winding into alternating current (AC) electricity to be provided to the first winding.

3. The electric motor system as defined in claim 1, wherein a plurality of first windings are provided in a three-phase configuration.

4. The electric motor system as defined in claim 1, wherein second winding is wound in sufficient turns around said stator portion such that electricity passing through the second winding from the direct current source saturates said stator portion.

5. The electric motor system as defined in claim 1, further comprising a failure detection apparatus communicating with the DC source for interruption of an electricity supply of the DC source to the motor upon detection of a fault in the motor system requiring motor shutdown.

6. The electric motor system as defined in claim 1, further comprising at least a second motor system as defined in claim 1, and wherein the at least two motor systems are co-mounted on a common shaft.

7. The electric motor system as defined in claim 6, wherein the at least two motor systems have a common rotor and stator, and wherein the at least two motor systems are separately controllable, and wherein the windings of the respective motor systems are confined to distinct non-overlapping sectors of the common stator.

8. A method for controlling an electric motor system, the system including at least one motor having a magnetic rotor and a magnetically conductive stator having at least one winding, the rotor and stator together defining at least a first magnetic circuit encircling a first portion of a first one of the stator windings, the stator defining at least a second magnetic circuit therein, the second magnetic circuit encircling a second portion of the first stator winding, the second magnetic circuit remote from the first magnetic circuit and remote from the rotor, the method comprising the steps of:
  operating the motor to drive an output shaft thereof, the step of operating including the step of saturating at least a portion of the second magnetic circuit to maintain an impedance of said winding at a first value during operation;
  requiring motor shutdown; and then
  shutting down the motor, including the step of de-saturating at least said portion of the second magnetic circuit to increase the impedance of the winding to a second value, the second value significantly higher than the first value such that current flow in the winding is effectively limited to a desired value.

9. The method of claim 8 wherein the desired current value is substantially zero, such that drag torque generated by continued rotation of the motor is substantially zero.

10. The method of claim 8 further comprising the step of continuing to drive the output shaft after said step of shutting down the motor.

11. The method of claim 10 wherein the output shaft is driven by at least a second motor connected to the shaft.

12. The method of claim 11, further comprising the step of adjusting an output torque of the second motor after the step of shutting down, to compensate to the lost torque attributed to said step of shutting down the other motor.

13. The method of claim 8 wherein the step of requiring motor shutdown includes the step of detecting a fault in the motor.

14. The method of claim 8 wherein the step of saturating at least a portion of the second magnetic circuit includes passing a saturating current through a second winding wrapped around a portion of the stator remote from the first magnetic circuit carrying said portion of the second magnetic circuit, and wherein the step of de- saturating at least said portion of the second magnetic circuit includes reducing a current level in said second winding below a saturation current level.

* * * * *